(12) United States Patent
Best et al.

(10) Patent No.: US 11,875,707 B2
(45) Date of Patent: Jan. 16, 2024

(54) SYSTEM, METHOD AND APPARATUS FOR ADAPTIVE DRIVER TRAINING

(71) Applicant: Advanced Training System LLC, St. Petersburg, FL (US)

(72) Inventors: Aaron M. Best, Murray, UT (US); J. Ken Barton, Sandy, UT (US); David J Havell, Salt Lake City, UT (US); Reginald T. Welles, Salt Lake City, UT (US); Darrell R. Turpin, Murray, UT (US); James W. Voorhees, Vancouver, WA (US); John Kearney, Sr., St. Pete Beach, FL (US); Camille B. Price, Kaysville, UT (US); Nathan P. Stahlman, Vancouver, WA (US); Aaron J. Turpin, Taylorsville, UT (US); Aaron M. Purvis, Vancouver, WA (US)

(73) Assignee: Advanced Training Systems, Inc., St. Petersburg, FL (US)

( * ) Notice: Subject to any disclaimer, the term of this patent is extended or adjusted under 35 U.S.C. 154(b) by 219 days.

(21) Appl. No.: 16/576,822

(22) Filed: Sep. 20, 2019

(65) Prior Publication Data

US 2020/0020244 A1 Jan. 16, 2020

Related U.S. Application Data

(63) Continuation-in-part of application No. 14/285,017, filed on May 22, 2014, now Pat. No. 11,037,461, (Continued)

(51) Int. Cl.
*G09B 9/05* (2006.01)

(52) U.S. Cl.
CPC .................................... *G09B 9/05* (2013.01)

(58) Field of Classification Search
CPC .. G09B 9/04; G09B 9/05; G09B 9/052; Y10S 706/927
See application file for complete search history.

(56) References Cited

U.S. PATENT DOCUMENTS

| 3,251,142 A | * | 5/1966 | Jazbutis | G09B 9/05 434/69 |
|---|---|---|---|---|
| 3,309,794 A | | 3/1967 | Greenshields | |

(Continued)

FOREIGN PATENT DOCUMENTS

| EP | 0483991 A2 | 5/1992 |
|---|---|---|
| EP | 2439718 A1 | 4/2012 |

(Continued)

OTHER PUBLICATIONS

Dr. Painter et al., "General Aviation Pilot Advisory and Training System Semiannual Technical Progress Report", pp. 1-36, Sep. 16, 1997.

(Continued)

*Primary Examiner* — Peter R Egloff
(74) *Attorney, Agent, or Firm* — Larson & Larson; Frank Liebenow; Justin P. Miller (57) ABSTRACT

A method and apparatus for driver/operator training includes, in a training system, while presenting a simulation segment: collecting data from at least one input device and analyzing the data to predict a potential future issue. If this analysis indicates that there exists the potential future issue, an informational message is presented to warn of the trainee of the potential future issue.

20 Claims, 10 Drawing Sheets

Related U.S. Application Data which is a continuation of application No. 12/889,448, filed on Sep. 24, 2010, now Pat. No. 8,770,980.

(60) Provisional application No. 61/277,768, filed on Sep. 29, 2009.

(56) References Cited

U.S. PATENT DOCUMENTS

| | | |
|---|---|---|
| 3,479,750 A | 11/1969 | Swanson |
| 3,583,079 A | 6/1971 | Koci |
| 3,611,589 A | 10/1971 | Wiltse |
| 3,896,564 A | 7/1975 | Dewey et al. |
| 3,936,955 A | 2/1976 | Gruen |
| 4,034,484 A | 7/1977 | Radice |
| 4,464,117 A | 8/1984 | Foerst |
| 4,683,891 A | 8/1987 | Cornellier et al. |
| 4,846,686 A | 7/1989 | Adams |
| 5,015,189 A | 5/1991 | Wenzinger, Jr. |
| 5,116,051 A | 5/1992 | Moncrief et al. |
| 5,184,956 A | 2/1993 | Langlais et al. |
| 5,197,003 A | 3/1993 | Moncrief et al. |
| 5,277,584 A | 1/1994 | DeGroat et al. |
| 5,287,489 A | 2/1994 | Nimmo et al. |
| 5,366,376 A | 11/1994 | Copperman |
| 5,399,091 A | 3/1995 | Mitsumoto |
| 5,415,550 A * | 5/1995 | Aoki ............... G09B 9/05 434/29 |
| 5,626,362 A | 5/1997 | Mottola |
| 5,707,237 A | 1/1998 | Takemoto |
| 5,823,876 A | 10/1998 | Unbehand |
| 5,888,074 A | 3/1999 | Staplin et al. |
| 5,921,780 A | 7/1999 | Myers |
| 5,951,018 A | 9/1999 | Mamitsu |
| 6,053,737 A | 4/2000 | Babbitt et al. |
| 6,105,737 A | 8/2000 | Weigert |
| 6,186,794 B1 | 2/2001 | Brown et al. |
| 6,200,139 B1 | 3/2001 | Clapper |
| 6,206,700 B1 | 3/2001 | Brown et al. |
| 6,227,862 B1 | 5/2001 | Harkness |
| 6,270,349 B1 | 8/2001 | Ng |
| 6,270,350 B1 | 8/2001 | Christopher |
| 6,361,321 B1 | 3/2002 | Huston et al. |
| 6,427,063 B1 | 7/2002 | Cook et al. |
| 6,431,872 B1 | 8/2002 | Shiraishi |
| 6,915,104 B2 | 7/2005 | Yonezu et al. |
| 6,916,074 B2 | 7/2005 | Jung |
| 6,948,398 B2 | 9/2005 | Dybro |
| 6,994,361 B2 | 2/2006 | Nishimura |
| 7,052,277 B2 | 5/2006 | Kellman |
| D531,221 S | 10/2006 | Shiraishi |
| 7,467,121 B2 | 12/2008 | Hagelin |
| 7,512,577 B2 | 3/2009 | Slemmer et al. |
| 7,625,287 B2 | 12/2009 | Champagne |
| 7,895,136 B2 | 2/2011 | Slemmer et al. |
| 7,949,295 B2 | 5/2011 | Slemmer et al. |
| 8,113,844 B2 | 2/2012 | Huang et al. |
| 8,170,976 B2 | 5/2012 | Dargue et al. |
| 8,770,980 B2 | 7/2014 | Best et al. |
| 2002/0146667 A1 | 10/2002 | Dowdell et al. |
| 2003/0039948 A1 | 2/2003 | Donahue |
| 2003/0233155 A1 | 12/2003 | Slemmer et al. |
| 2004/0158476 A1 | 8/2004 | Blessinger |
| 2004/0161731 A1 | 8/2004 | Arington |
| 2004/0259059 A1 | 12/2004 | Aoki |
| 2005/0277099 A1 | 12/2005 | Van Schaack et al. |
| 2006/0040239 A1 | 2/2006 | Cummins |
| 2006/0078856 A1 | 4/2006 | Kellman |
| 2006/0195412 A1 | 8/2006 | Slemmer et al. |
| 2007/0048690 A1 | 3/2007 | Stricek et al. |
| 2007/0072154 A1 | 3/2007 | Akatsuka et al. |
| 2007/0122778 A1 | 5/2007 | Beitel |
| 2008/0064014 A1 | 3/2008 | Wojtczak |
| 2008/0082372 A1 | 4/2008 | Burch |
| 2008/0145830 A1 | 6/2008 | Huang et al. |
| 2008/0180523 A1 | 7/2008 | Stratton et al. |
| 2009/0035733 A1 | 2/2009 | Meitar et al. |
| 2009/0098519 A1 | 4/2009 | Byerly |
| 2009/0163283 A1 | 6/2009 | Childress |
| 2009/0181349 A1 | 7/2009 | Harkness |
| 2009/0187519 A1 | 7/2009 | Slemmer et al. |
| 2009/0208910 A1 | 8/2009 | Brueckner |
| 2009/0306880 A1 | 12/2009 | Gomi |
| 2010/0003659 A1 | 1/2010 | Edmonds |
| 2010/0100520 A1 | 4/2010 | Dargue et al. |
| 2010/0182432 A1 | 7/2010 | Augst |
| 2010/0190142 A1 | 7/2010 | Gal et al. |
| 2010/0190143 A1 | 7/2010 | Gal et al. |
| 2010/0190145 A1 | 7/2010 | Singer et al. |
| 2010/0217573 A1 | 8/2010 | Hatcherson |
| 2011/0121938 A1 | 5/2011 | Slemmer et al. |
| 2011/0283866 A1 | 11/2011 | Hogan |
| 2012/0135382 A1 | 5/2012 | Winston et al. |
| 2014/0186810 A1 | 7/2014 | Falash |
| 2014/0188574 A1 | 7/2014 | Luca |
| 2015/0187224 A1 * | 7/2015 | Moncrief ............... G09B 9/052 434/30 |
| 2016/0163217 A1 * | 6/2016 | Harkness ............... G09B 5/06 434/65 |

FOREIGN PATENT DOCUMENTS

| | | | |
|---|---|---|---|
| KR | 10-2002-0030305 A | 4/2002 | |
| KR | 10-2002-0090751 A | 12/2002 | |
| RU | 48661 U1 | 10/2005 | |
| WO | 2010044982 A1 | 4/2010 | |
| WO | 2010-083563 A1 | 7/2010 | |
| WO | 2013/033723 A2 | 3/2013 | |

OTHER PUBLICATIONS

April Broomer, "CAE Simfinity™Suite of training devices", retrieved Mar. 14, 2011.

Ok-Choon Park, Jung Lee, "Adaptive Instructional Systems", Handbook of Research on Educational 1 Communications and Technology, Chapter 25, Association for Educational Communications and Technology, http://Dlearngen.org/-aust/EdTecheBooks/AECT HANDBOOK 2ND/25 .pdf.

Richard C. Atkinson, "Adaptive Instructional Systems", Psychology and Education Series, Technical Report No. 240, Nov. 20, 1974, Stanford University, Stanford, California, http://suppes-corpus.stanford.edu/techreports/ D IMSSS_240.pdf.

Small Business Innovation Research, "Adaptive Instructional Systems", U.S. Army Research Institute Rotary-Wing Aviation Research Unit, Fort Rucker, AL.

Third CLIPS Conference Proceedings, NASA Conference Publication 10162 vol. I, Washington, D.C., Nasa Center for AeroSpace Information, 1994.

Zhang et al., "Program-level Adaptive Memory Management", ISMM'06, Jun. 10-11, 2006, Ottawa, Ontario, Canada, http://anon.cs.rochester.edu/u/zhangchl/publications/ismm06.pdf.

Ludwig et al., "Developing an Adaptive Intelligent Flight Trainer", 2005, www.dtic.mil/cgi-bin/GetTRDoc?AD=ADA439799.

"Software to Detect Malfunctions in Anesthesia Equipment", Nasa Tech Briefs, Lyndon B. Johnson Space Center, Houston, Texas, Aug. 1, 2000.

8 Espacenet English language abstract of KR 10-2002-0030305, published Apr. 25, 2002.

9 Espacenet English language abstract of KR 10-2002-0090751, published Dec. 5, 2002.

* cited by examiner

SYSTEM, METHOD AND APPARATUS FOR ADAPTIVE DRIVER TRAINING

FIELD

This invention relates to the field of training and more particularly to a system that provides hints for improving skills of the trainee.

BACKGROUND

Driving training simulators are well known. Such simulators often included controls that simulate the target vehicle (e.g. car, truck, bus, etc). It is known that such simulators improve skills and safety by familiarizing the trainee with operation of the vehicle by presenting simulated situations in which, making the wrong decision does not result in a potential accident or bodily harm. In this way, the trainee learns basic driving skills before they eventually need to perform using the actual target vehicle and before they have to perform using that vehicle while operating in traffic.

There are many types of simulators known. The simplest simulator is a typical driving video game having a display screen and a hand controller. In some systems, a simulated steering wheel is provided. A mock-vehicle is displayed on the display screen and the driver uses the hand controller to keep the mock-vehicle on a simulated, moving roadway on the display screen. This type of simulator helps build driver hand and eye coordination, but does not provide the true control operation of the real steering wheel, brake, clutch, shifter, windshield views and mirror views. Such simulators are more of a game than an actual driver training system.

Another type of simulator includes a video display screen to simulate a windshield view, a steering wheel, a gas pedal, a brake pedal, a shifter and, optionally, a clutch pedal. A road situation is displayed on the display screen and the driver uses the controls to drive the simulated vehicle, moving down a roadway that is displayed on the display screen. This type of simulator helps build driver skills, but does not include interaction with speedometers, tachometers, etc. Such simulators don't provide feedback from the shifter such as gear grinding when the clutch isn't operated correctly. Furthermore, such simulators have a fixed configuration relating to a single type/layout of vehicle. In some such simulators, certain gauges are provided to simulate the operation and information provided to a driver of this singular vehicle. All current simulators provide fixed scenarios to the trainee and evaluate the trainee responses in a fixed program, progressing from scenario to scenario in a linear progress.

None of the current driver training simulators provide training simulations that provide real-time driving hints to the trainee.

Today, simulators provide a realistic environment in which a trainee is able to manipulate a virtual vehicle in a virtual reality (e.g. road system) without any danger of causing an accident and damaging other vehicles or hurting other drivers. Such simulators often run a pre-programmed simulation, monitor actions and responses of the trainee, and report results when the simulation is complete. The simulators of the past do not provide real-time coaching during the simulation to improve the learning experience of the trainee.

What is needed is a driver training system that provides real-time coaching during training scenarios that adapt to objects or events presented in the simulation.

SUMMARY

In one embodiment, a method of driver/operator training is disclosed including in a training system, while presenting a simulation segment: collecting data from at least one input device and analyzing the data to predict a potential future issue. If this analysis indicates that there exists the potential future issue, an informational message is presented to warn of the trainee of the potential future issue.

In another embodiment, method of driver operated training of a trainee on a training system is disclosed. The training system includes a computer that includes a storage device and a plurality of simulation segments; the simulation segments are stored on the storage device and accessible by the computer; the computer is operatively interfaced to one or more graphics displays, at least one of the graphics displays simulates a windshield of a target vehicle and the computer generates images on the graphics displays. Additionally, the computer is operatively interfaced to one of more input devices and one or more output devices, the input devices and output devices corresponding to control/indicator devices of the target vehicle that are in communication with the trainee. The method includes (a) the computer selecting a first simulation segment of the simulation segments as a current simulation segment and (b) presenting the current simulation segment on one or more of the graphics displays and/or one or more output devices, thereby the computer simulating an operational scenario of the target vehicle. (c) Collecting data from the one or more input devices by the computer. (d) The computer analyzes the data to predict a potential future issue and (e) if there exists the potential future issue; the computer presents an informational message to warn of the trainee of the potential future issue. (f) The computer determines a next simulation segments from the simulation segments and (g) repeats steps b-f until the first simulation segment is complete.

In another embodiment, a training system is disclosed. The training system includes a computer that includes data storage. A plurality of simulation segments are stored in the data storage and are accessible by the computer. There are one or more graphics displays, at least one which simulates a windshield of a target vehicle. The computer has hardware/software for generating images on the graphics displays. One or more input devices that correspond to control devices of the target vehicle are operatively coupled to the computer. Software running on the computer causes the computer to present a simulation segment of the plurality of simulation segments. In such, the software running on the computer causes the computer to display a content of the simulation segment on one or more of the graphics displays, thereby the software running on the computer causes the computer to simulate an operation of the target vehicle. Concurrently, the software running on the computer causes the computer to collect data from the one or more input devices; to analyze the data and determines if a potential future issue exists; and if the potential future issue exists, the software running on the computer causes the computer to emit an informational message that provides a hint regarding the potential future issue.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures. In general, the training system 10 is often known as a driving/flying/boating/engineering/etc simulator, depending upon the target vehicle (car/truck, airplane, boat, train, etc). The training system 10 is any system for training a trainee 5 (e.g. truck driver trainee) that simulates some or all of the operator controls (e.g. steering, brake, shifter) and visuals (e.g. mirrors, windows, dash boards, etc) without requiring the trainee to operate the actual vehicle (e.g., drive the actual truck). Although not limited to any particular target vehicle, the remainder of this description will use a truck as an example of such target vehicle for brevity reasons. Note that some of the controls described (e.g. shifter, clutch, steering wheel) are related to certain types of target vehicles and not necessarily to others. For example, many automobiles have automatic transmissions and, therefore, do not have a clutch. In another example, an airplane does not have rear-view mirrors, shifters, clutches, etc. Likewise, a truck driving simulator has rear-view mirrors, shifters, clutches, but does not have ailerons, thrust, altitude gauges, etc.

Figure 1:
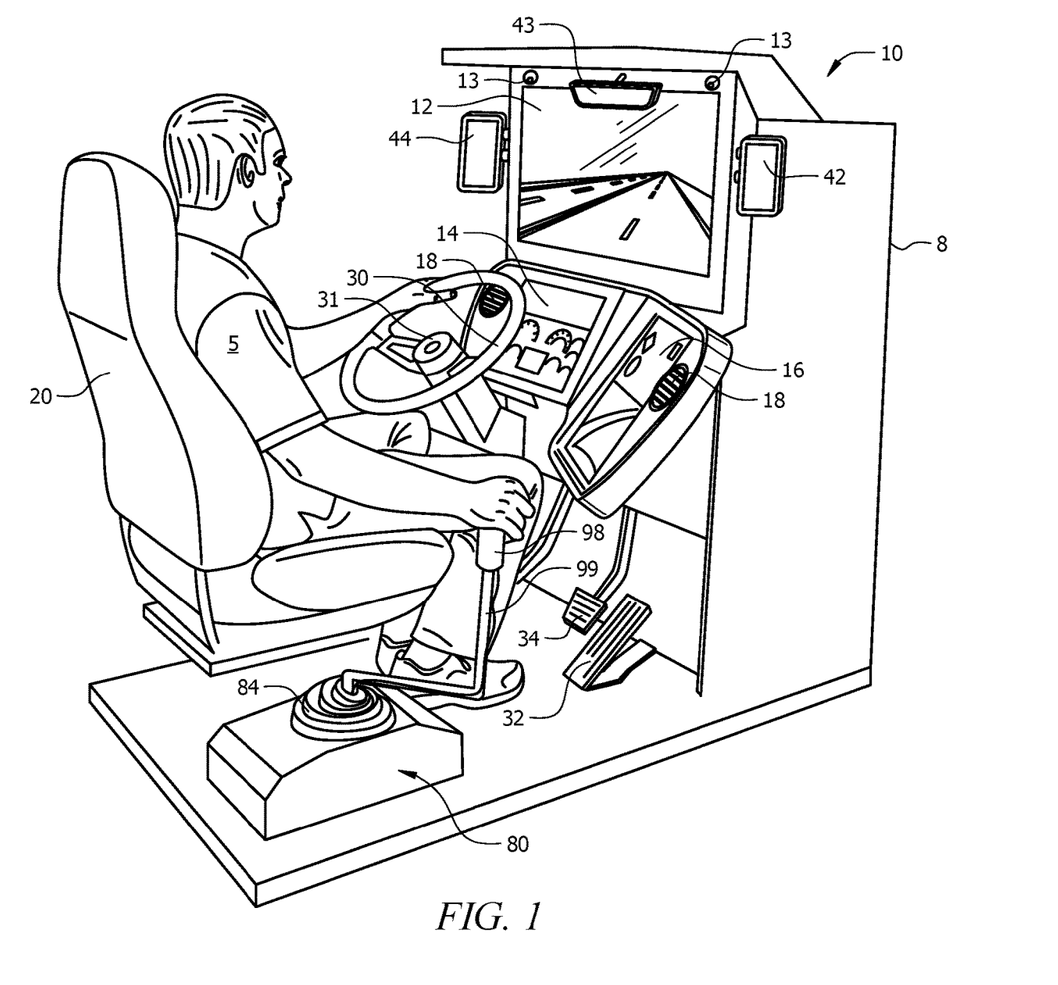
FIG. 1 illustrates a perspective view of a training system.

Referring to FIG. 1, a perspective view of a training system 10 is shown. The training system 10 is supported and/or housed by/in a cabinet 8. The training system 10 provides life-like training without or before operation of the target vehicle, in this example a vehicle such as a truck or an automobile.

The exemplary training system 10 has a windshield display 12 on which a simulated driving situation is presented as the trainee 5 would see through the windshield of the target vehicle. The windshield display 12 shows, for example, the road being driven upon, the grade of the road, obstacles such as other vehicles, tress, parked cars, pot holes, etc. In some training scenarios, the windshield is fogged or distorted by simulated weather condition s such as rain, snow, sleet, etc.

The trainee 5 typically sits on a seat 20 that, preferably, though not required, mimics a seat of the target vehicle. The trainee has controls similar to those in the target vehicle such as a steering wheel 30, horn 31, gas pedal 32, brake pedal 34, clutch 36 (see FIG. 2), and shifter having a shifter shaft 99 and a shifter handle 98 and shifter sub-system 80. The shifter subsystem is often covered with a boot 84 to keep dust, liquids, etc from damaging the working components.

In a preferred embodiment, though not required, the steering wheel 30 and shifter handle 98 have touch sensors that detect if and when the trainee 5 has is grasping the steering wheel 30 and/or shifter handle 98. The touch sensors are any known touch sensor such as a mechanical switch or switches, capacitive or resistive detectors, etc. In some embodiments, the position of the trainee's hands is determined by the camera(s) 13 in conjunction with or instead of the touch sensors.

Figure 3:
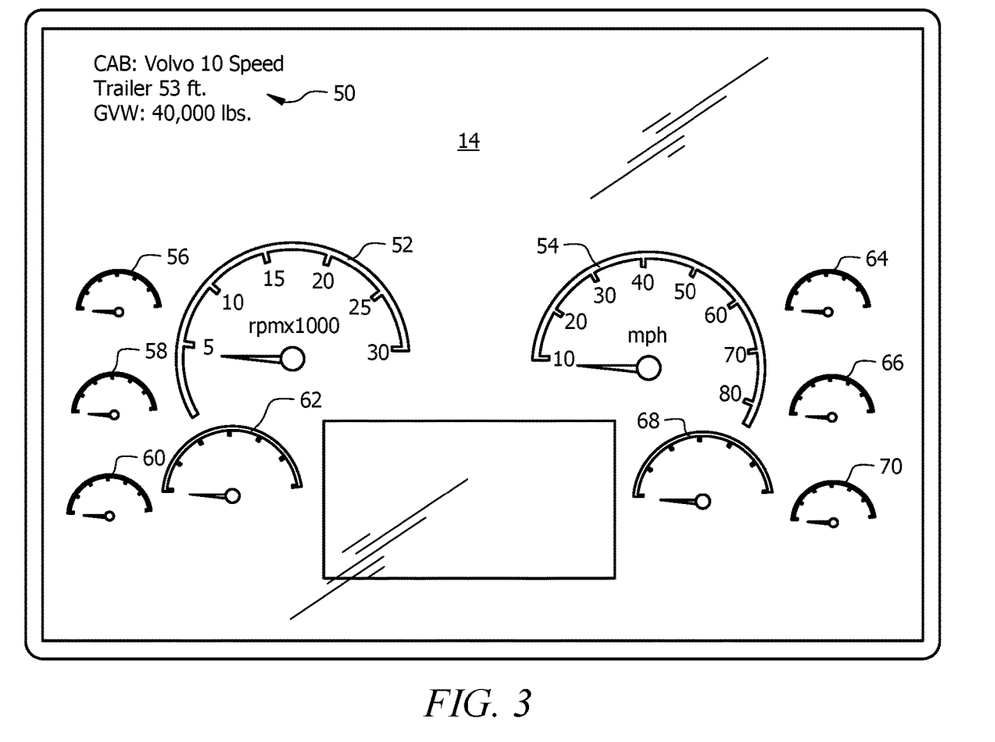
FIG. 3 illustrates a plan view of a training system dashboard.

In a position similar to that of a dashboard of the target vehicle is a dashboard (e.g. display) 14 (details of an exemplary dashboard 14 are shown in FIG. 3). The dashboard 14 contains displays and indicators that inform the trainee of various target vehicle and external conditions such as speed, engine speed (RPM), engine temperature, outside temperature, brake temperature, air pressure, oil pressure, etc. In some embodiments, the dashboard 14 is fabricated from actual meters, indicators, etc, as in the target vehicle. In a preferred embodiment, the dashboard 14 is a graphics display on which the meters, indicators, etc of the target vehicle are displayed/simulated. It is also preferred that each sub-component of the dashboard 14 is touch-sensitive. In such, the training system 10 prompts the trainee 5 to, for example, "touch" the tachometer, and the training system 10 receives a signal corresponding to the sub-component/icon that the trainee 5 touches. In embodiments in which the dashboard 14 is a graphics display, it is anticipated that the graphics display is touch-sensitive such that a touch over a displayed sub-component signals the training system 10 of the location touched, and therefore, the identification of the sub-component that is touched. In embodiments in which the dashboard 14 is fabricated from actual meters, indicators, etc, some or all sub-components have touch sensors such as pressure detectors or capacitive touch sensors, etc.

In some embodiments, one or more side-view mirror displays 42/44 are mounted on or in the cabinet 8. When provided, the side-view mirror displays 42/44 show a simulated view of what is visible to the trainee 5 such as vehicles being passed and/or approaching vehicles. In some embodiments, the side-view mirror displays 42/44 display objects as they would appear in a real side-view mirror simulating concave or convex mirrors as appropriate. Additionally, in some embodiments, the image displayed includes simulated dirt, etc, as often occurs in real life.

In some embodiments, a rear-view mirror display 43 that is center-mounted is also provided (not shown). When provided, the rear-view mirror display 43 shows a simulated view of what is visible to the trainee 5 such as approaching vehicles and/or oncoming vehicles.

In some embodiments, an information console 16 is provided. The information console 16 does not simulate something from the target vehicle. Instead, the information console 16 presents menus, status information, audio messages, and auxiliary information to the trainee 5 and accepts inputs such as scenario selection, study chapter selection, login data, etc.

In some embodiments, an audio system 18 is provided to enhance realism and provide simulations of sounds that are normally heard when operating the target vehicle such as engine noise, tire noise, other vehicles, rain or sleet hitting the target vehicle, emergency vehicles, sounds of a collision, etc.

Figure 5:
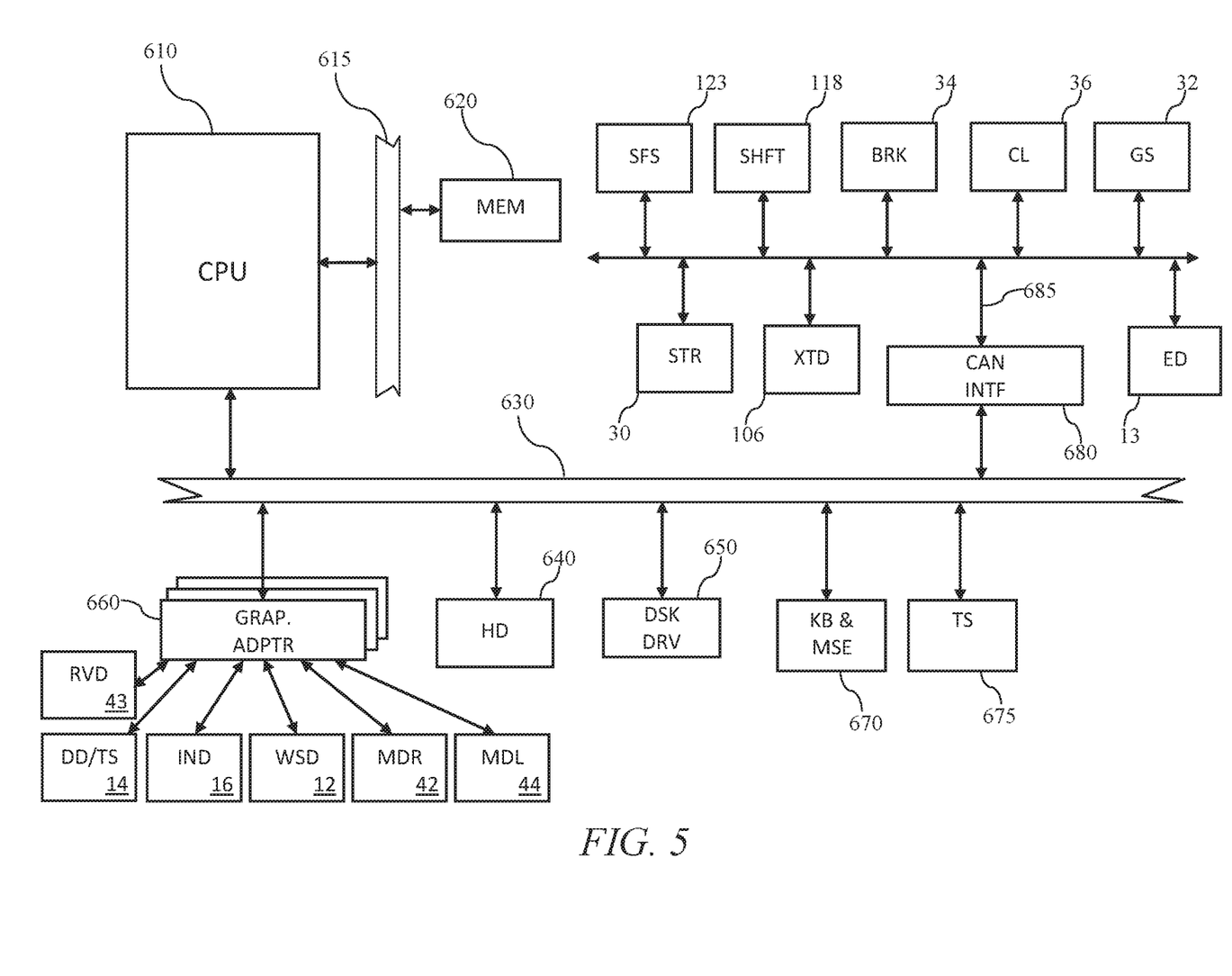
FIG. 5 illustrates a schematic view of a typical computer system.

In some embodiments, one or more cameras 13 (e.g. trainee sensors) are provided to detect various aspects of the trainee 5 such as position upon the seat 20, head angle, attention, drowsiness, where the trainee is looking, and in some embodiments, verify that the trainee 5 is who he/she says he/she is. This information is used to make sure the trainee is properly performing the task at hand. The cameras 13 (e.g. trainee sensors) are, for example, cameras, light detectors, ultrasonic transducers, or any other detector as known in the industry. The cameras 13 (e.g. trainee sensors)

are coupled to the computer 100 (see FIG. 5). The computer 100 analyzes images from the cameras 13 (e.g. trainee sensors) to determine what the trainee 5 is doing and/or where the trainee 5 is looking to provide feedback to the trainee 5 and evaluate the trainee's abilities (e.g. the camera(s) 13 are used to determine if the trainee 5 looked in the right mirror display 42 before changing lanes).

Referring to FIGS. 1A, 1B, 1C, and 1D, perspective views of a training system with coaching are shown. As the trainee 5 operates the vehicle during the simulated driving situation (e.g. simulation segment), the trainee 5 is expected to perform certain tasks and react to situations presented in the simulated driving situation. For example, the trainee 5 is required to turn on their lights before dusk or to change lanes when a lane is blocked, etc. As the trainee 5 is presented with certain simulated driving situations such as dusk or a blocked lane, sometimes the trainee 5 doesn't recognize the need to take such actions (e.g. turn on lights or change lane). In such situations, providing hints to the trainee 5 often provides enhanced learning rather than having the trainee 5 create a virtual problem (e.g. not able to see the road ahead or crashing into whatever has blocked the lane). For this, the training system recognizes that the trainee 5 is not taking the expected action (e.g. turn on lights, change lane) and responsive to the lack of action, the training system presents a pop-up or audio message to provide hints to the trainee 5.

Figure 1A:
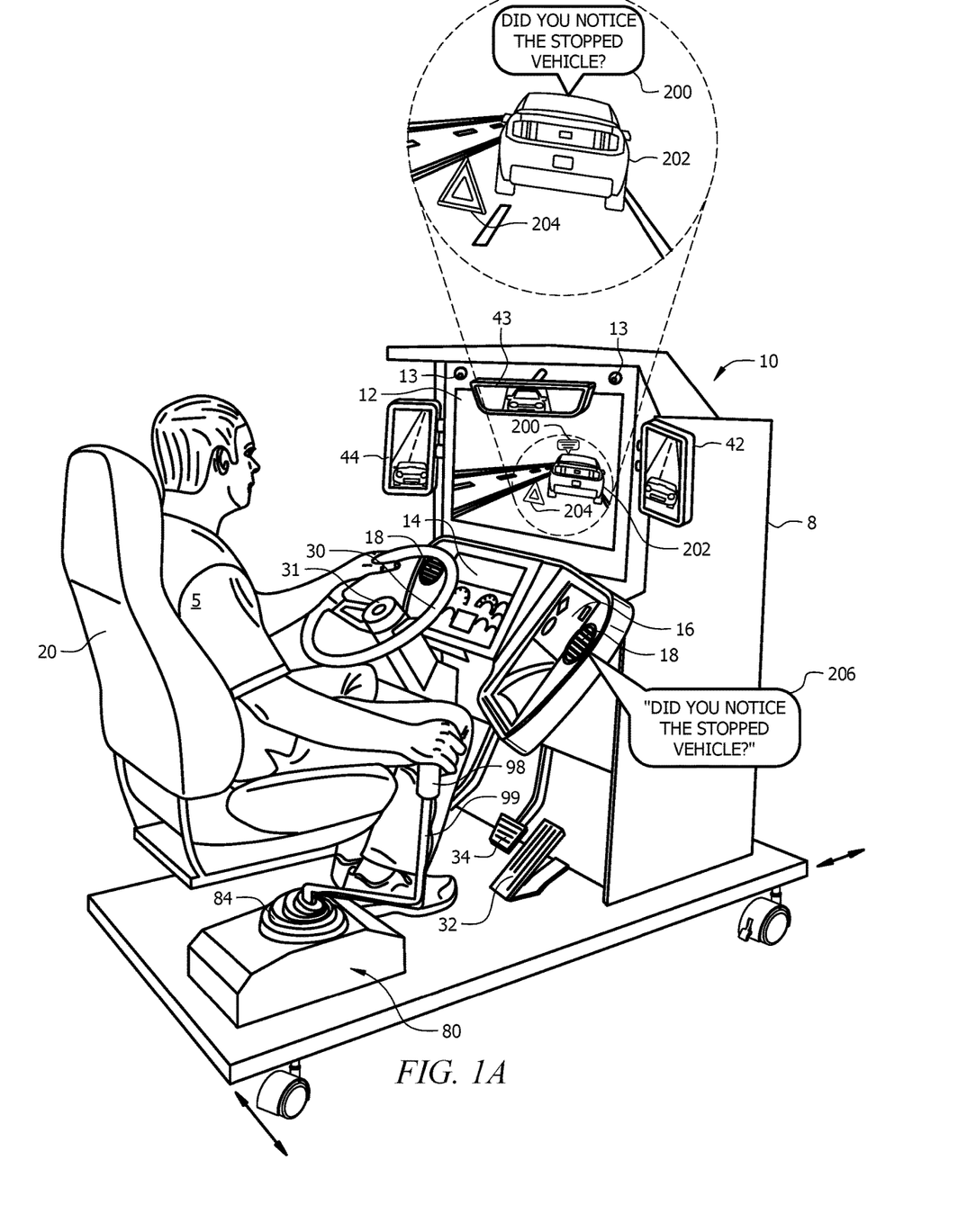
FIGS. 1A, 1B, 1C, and 1D illustrate perspective views of a training system with coaching.

In FIG. 1A, the right lane ahead is blocked by a stopped vehicle 202 (with a reflector 204). The trainee 5 is getting close to the stopped vehicle 202, and without changing lanes soon, the trainee 5 will crash into the stopped vehicle 202 (virtually crash). While there is still time to take action, the training system presents a hint message 200/206 such as, "Did you notice the stopped vehicle?" In some embodiments, the hint message 200/206 is a pop-up message 200 while in some embodiments, the hint message 200/206 is an audio message 206, while in some embodiments, both the pop-up message 200 and audio message 206 are presented. The hint message 200/206 is preferably presented to the trainee 5 providing sufficient time for the trainee 5 to react and take the necessary action (e.g. change lanes or stop).

Figure 1B:
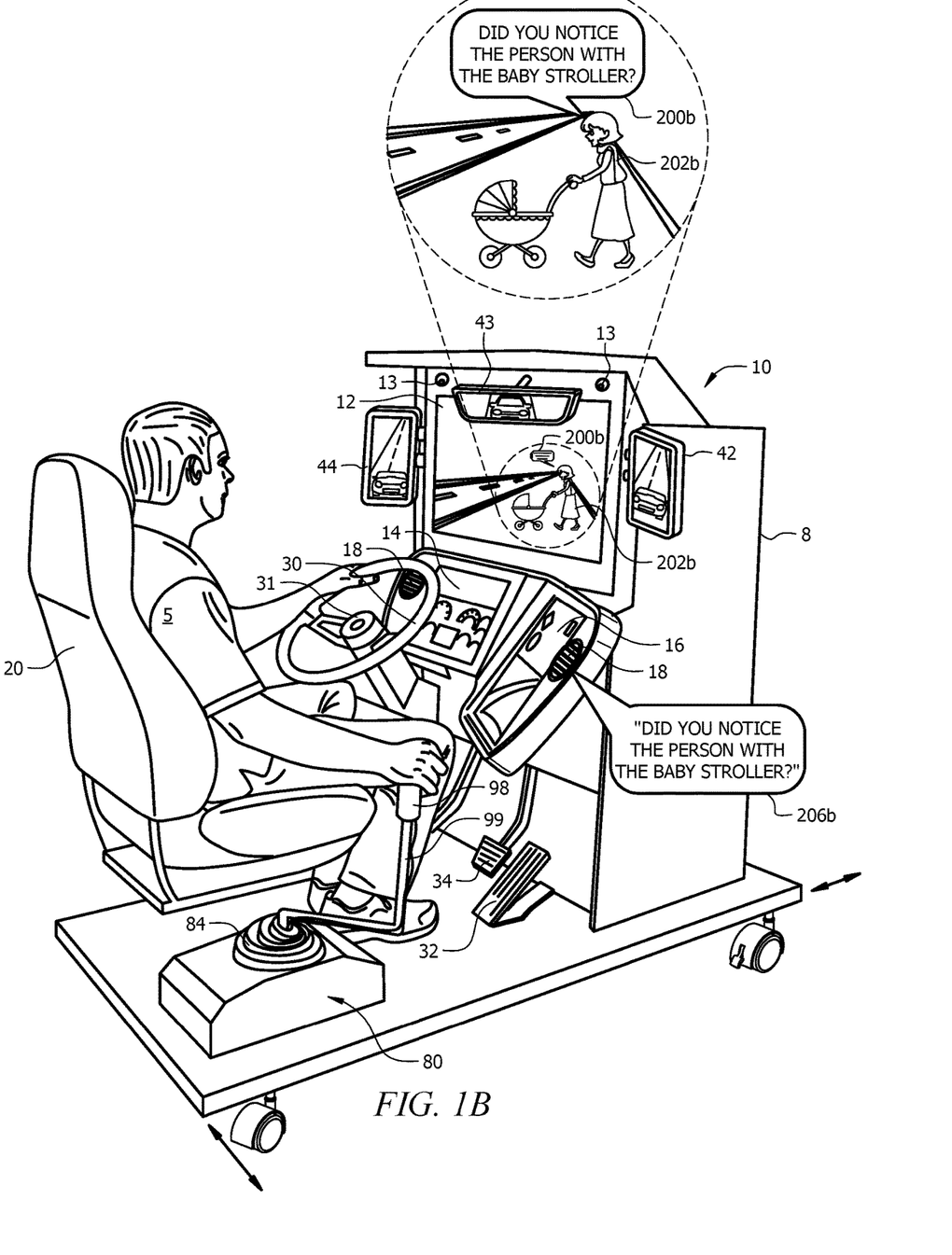

In FIG. 1B, a person with a baby stroller 202b is ahead ready to cross the road. The trainee 5 is getting close to the person with a baby stroller 202b, and without changing lanes soon, if the person with a baby stroller 202b moves into the roadway, the trainee 5 run over the person with a baby stroller 202b (virtually). While there is still time to take action, the training system presents a hint message 200b/206b such as, "Did you notice the person with the baby stroller?" In some embodiments, the hint message 200b/206b is a pop-up message 200b while in some embodiments, the hint message 200b/206b is an audio message 206b, while in some embodiments, both the pop-up message 200b and audio message 206b are presented. The hint message 200b/206b is preferably presented to the trainee 5 providing sufficient time for the trainee 5 to react and take the necessary action (e.g. change lanes or stop).

Figure 1C:
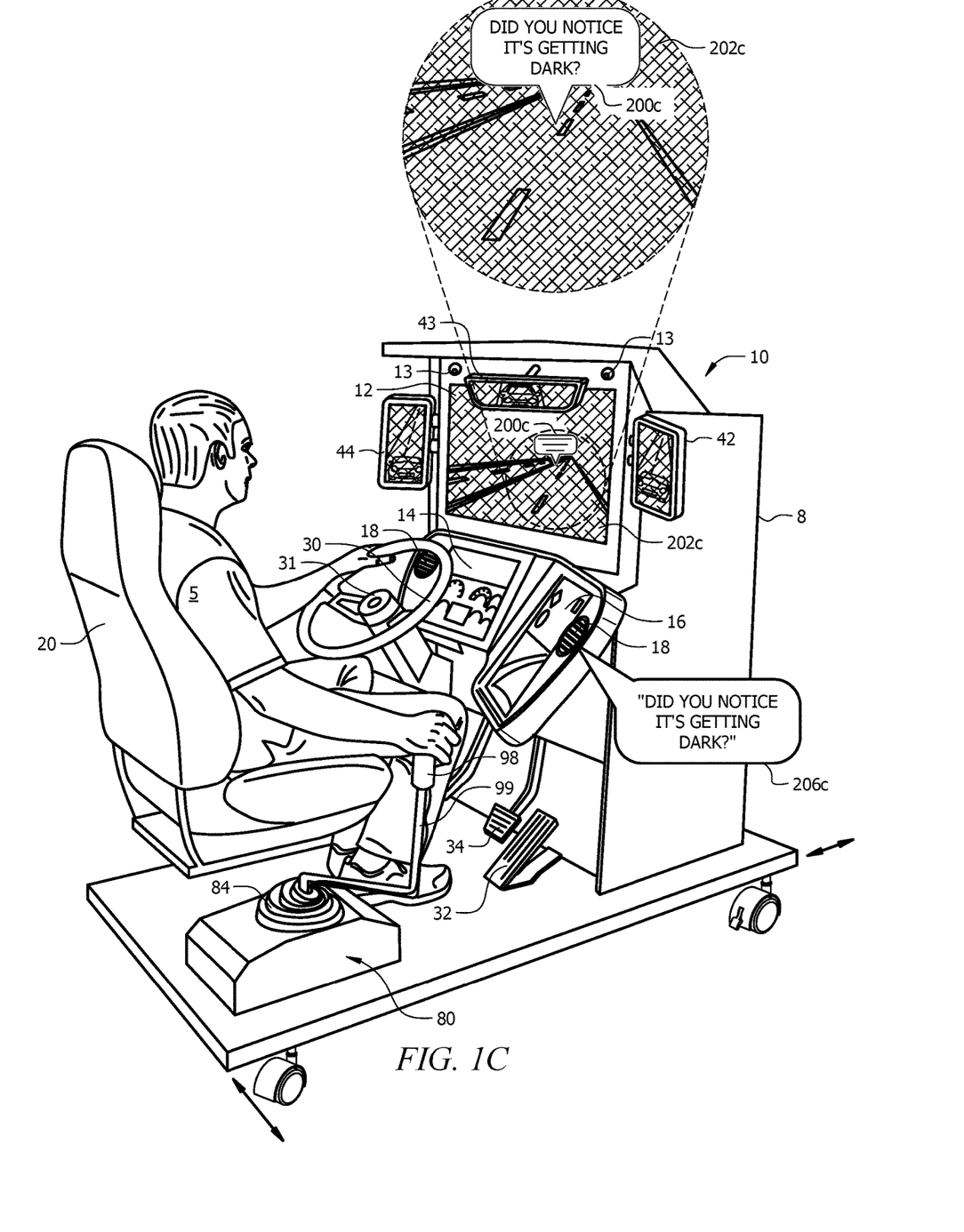

In FIG. 1C, it is getting dark and visibility 202c is reduced. The trainee 5 has not turned on the headlights, and without turning on the headlights soon, the trainee 5 will not be able to see the roadway very well (virtually). While there is still time to take action, the training system presents a hint message 200c/206c such as, "Did you notice that it is getting dark?" In some embodiments, the hint message 200c/206c is a pop-up message 200c while in some embodiments, the hint message 200c/206c is an audio message 206c, while in some embodiments, both the pop-up message 200c and audio message 206c are presented. The hint message 200c/206c is preferably presented to the trainee 5 providing sufficient time for the trainee 5 to react and take the necessary action (e.g. turn on the headlights).

Figure 1D:
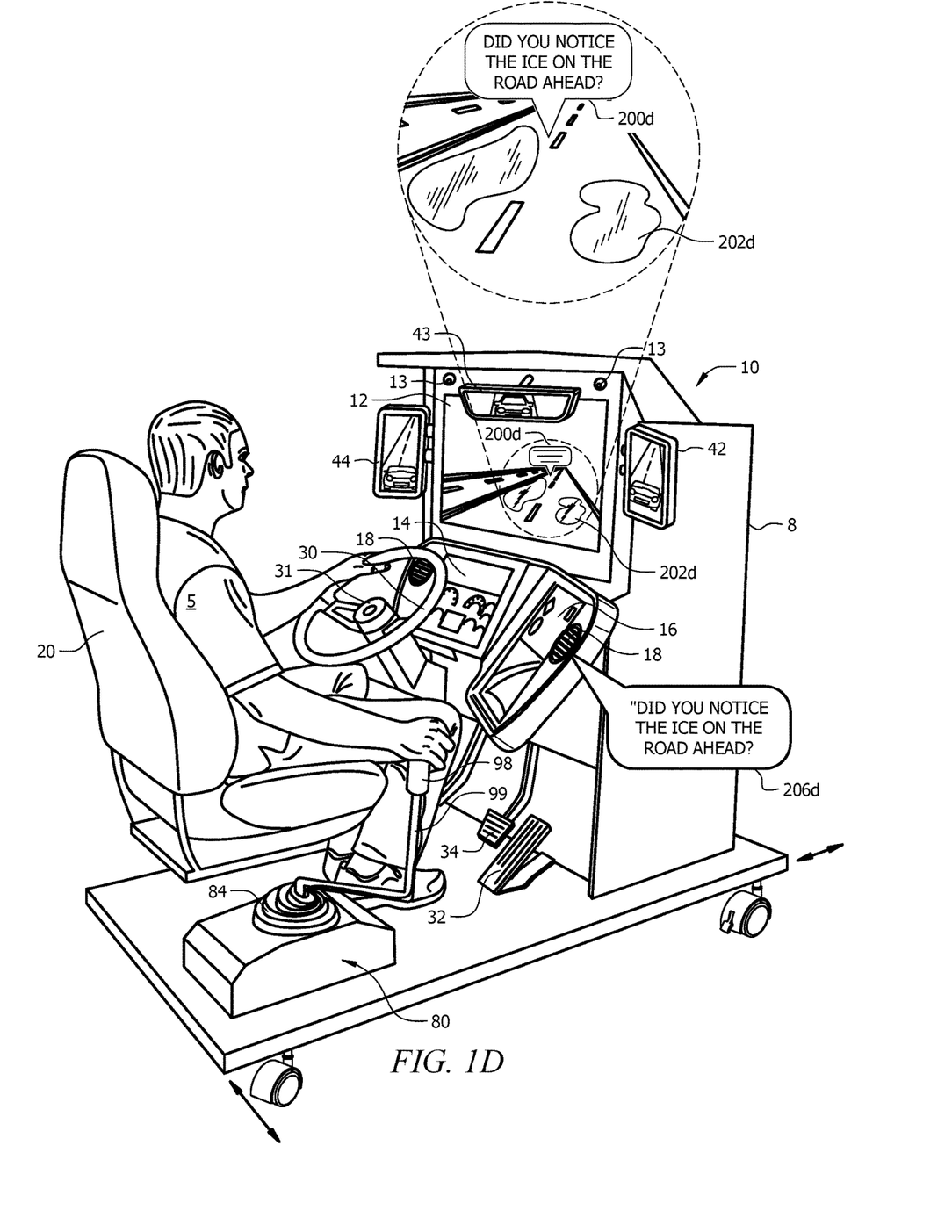

In FIG. 1D, the roadway ahead is icy as shown by the icy surface 202d. The trainee 5 is maintaining speed, and without slowing down, the trainee 5 will likely skid on the icy surface 202d (virtually). While there is still time to take action, the training system presents a hint message 200d/206d such as, "Did you notice the ice on the road ahead?" In some embodiments, the hint message 200d/206d is a pop-up message 200d while in some embodiments, the hint message 200d/206d is an audio message 206d, while in some embodiments, both the pop-up message 200d and audio message 206d are presented. The hint message 200d/206d is preferably presented to the trainee 5 providing sufficient time for the trainee 5 to react and take the necessary action (e.g. slow down).

Figure 2:
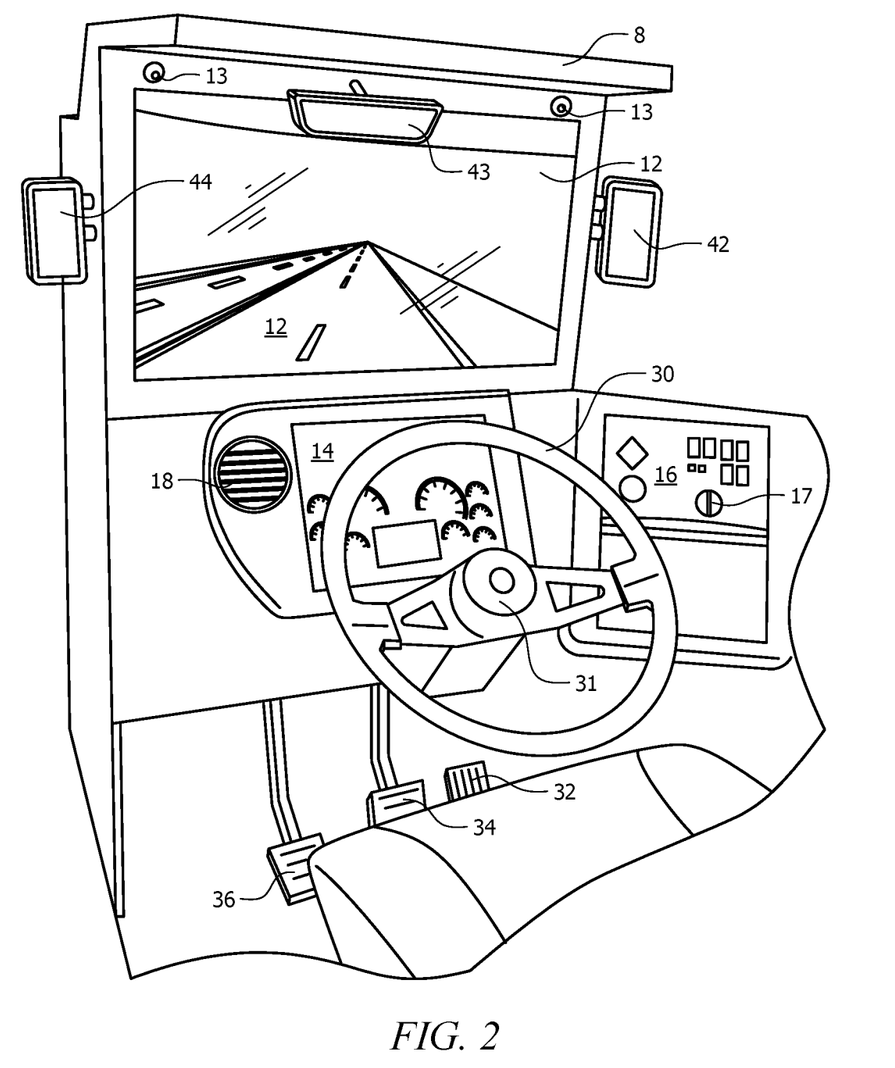
FIG. 2 illustrates a second perspective view of a training system.

Referring to FIG. 2, a second perspective view of a training system is shown. In this view, an optional centrally-located rear-view mirror display 43 is shown above the windshield display 12. When provided, the rear-view mirror display 43 shows a simulated view of what is visible to the trainee 5 such as vehicles being passed and/or approaching vehicles. In some embodiments, one, two or three mirror displays 42/43/44 are provided.

In FIG. 2, the information console 16 is shown with greater detail. This information console 16 does not necessarily simulate a feature of the target vehicle, but in some embodiments, does contain features that map to a feature of the target vehicle. In this example, the information console 16 includes an ignition switch icon 17 that looks like the ignition switch of the target vehicle. Typically, the information console 16 shows informational messages such as information regarding the current courseware segment or summaries of the last simulation (e.g. the trainee 5 hit two parked cars and knocked down one telephone pole, etc). In a preferred embodiment, the information console 16 includes a touch screen. In such embodiments, the trainee 5 uses the touch capabilities to make selections and to select items as requested (e.g. "touch the ignition switch").

In some embodiments, the windshield display 12 is also touch sensitive. This provides even more capabilities for testing the trainee's 5 ability to identify environmental (e.g. roadway) objects such as signs, barriers, etc. For example, the trainee is asked to touch the stop sign or touch the lane in which is most appropriate for his/her vehicle, etc.

Again, in some embodiments, one or more cameras 13 (e.g. trainee sensors) are integrated into the training system 10. The trainee sensors (e.g. camera 13 or cameras 13) are coupled to the computer 100. The computer 100 analyzes data from the cameras 13 (e.g. trainee sensors) to determine what the trainee 5 is doing and/or where the trainee 5 is looking to provide feedback to the trainee 5 and evaluate the trainee's abilities (e.g. the cameras 13 are used to determine if the trainee 5 looked in the right mirror display 42 before changing lanes). The cameras 13 (e.g. trainee sensors) are positioned as needed to determine the position, stance and view of the trainee 5.

Referring to FIG. 3, a plan view of an exemplary training system dashboard 14 is shown. The dashboard 14 contains displays and indicators that inform the trainee of various target vehicle internal and external conditions such as speed 54, engine speed (RPM) 52, engine temperature 56, outside temperature 58, battery voltage 60, air pressure 64, oil pressure 66, fuel reserve 68, oil temperature 70 etc. In some embodiments, the dashboard 14 is fabricated from actual meters, indicators, etc, as in the target vehicle (not shown).

In a preferred embodiment, the dashboard 14 is a graphics display on which the meters, indicators, etc of the target vehicle are simulated by images (e.g. icons) of the respective components from the target vehicle. In this way, the dashboard 14 is reconfigurable between different target vehicles (e.g. some vehicles have more/less meters and more/less "idiot lights").

It is also preferred that each sub-component of the dashboard 14 is touch-sensitive. In the example of FIG. 3, the entire graphics display 14 is touch sensitive (touch panel as known in the industry) and, touching of any of the sub-components 52/54/56/58/60/62/64/66/68/70 signals the computer 100 that the corresponding sub-components 52/54/56/58/60/62/64/66/68/70 was touched. This provides the capability of questions/response scenarios like, "touch the fuel gauge . . . " and detection of the icon (sub-component 52/54/56/58/60/62/64/66/68/70) that was touched.

In some embodiments, status or identification information 50 is provided on the dashboard 14 such as the vehicle details and, perhaps, the name of the trainee 5, etc.

Figure 4:
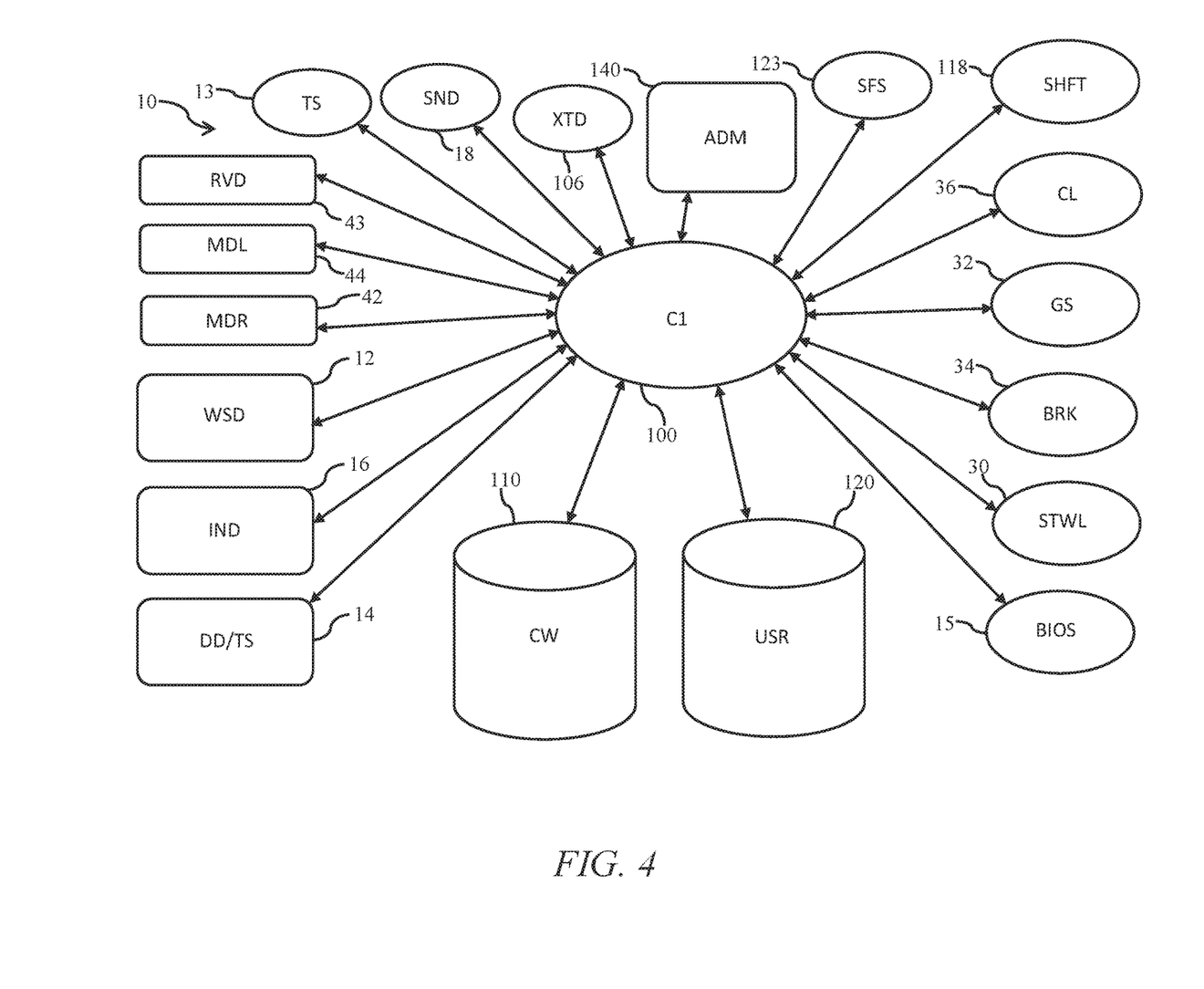
FIG. 4 illustrates a schematic view of an exemplary training system.

Referring to FIG. 4, a schematic view of an exemplary training system is shown. As discussed prior, it is anticipated that one or more of the following described features is or is not present in all embodiments. For example, in some embodiments, there is no camera 13 (e.g. no trainee sensor) that determines where the trainee 5 is looking, etc.

Central to the training system 10 is a computer 100. Many different types of computers 100 are anticipated such as personal computers, dedicated computers and server computers. It is anticipated that computers 100 of one training system 10 are connected by local or wide area networks to other training systems 10 and/or to central data collection and control systems (not shown). In some embodiments, the computer has a motherboard with multiple PCI-Ex16 slots that provide multiple simulator display channels with 2D and/or 3D capability. A video processor card is optionally installed in each of these slots. The video cards run the simulation in multi channel mode with low transient delay times. It is anticipated, though not required, that a single image generator (single motherboard computer) can drive multiple displays. Although any number of display channels is anticipated, the training system typically is configured with from 3 to 8 real time interactive screens.

The computer 100 includes, in some embodiments, a display device or terminal device 140. This terminal device 140 has a display screen, a keyboard and/or a touch screen and is primarily used by an administrator to operate the computer 100, for example, performing backups and other system administration function. In some embodiments, these functions are performed using one or more of the other components/displays 12/14/16.

The computer 100 also includes one or more persistent storage devices 110/120 such as hard drives, flash memory, etc. for storage of, for example, courseware 110 and user data 120. In a preferred embodiment, the one or more persistent storage devices 110/120 is one or more hard drives or solid-state drives. In some embodiments, the one or more storage devices 110/120 include a raid system to provide more reliable data storage.

Interfaced to the computer 100 are several components of the training system 10. The windshield display 12, dashboard (e.g. dashboard graphics display and touch screen) 14 and information console 16 are all interfaced to the computer 100 as known in the industry. The mirror displays 42/43/44 (when present) are also interfaced to the computer 100 as known in the industry. All specialized hardware devices such as the shifter touch detector 118 (also the X-position, Y-position, switch status not shown for brevity reasons), clutch 36 (position and force), gas pedal 32 (position and force), brake pedal 34 (position and force) and steering wheel 30 (rotation and touch) are also interfaced to the computer 100 as known in the industry. It is preferred that some or all of such interfaces are bi-directional to provide control of the device (e.g. vary the counter-force of the brake pedal 34 or gates of the transmission-shifter subsystem 80) and to receive feedback from the device (e.g. sufficient pressure was applied to the brake pedal 34, hands are on the steering wheel 30 or the trainee 5 successfully shifted from first gear into second gear).

In embodiments that have trainee sensors such as cameras 13, etc., the trainee sensors (e.g. cameras 13) are interfaced to the computer 100 as known in the industry.

In embodiments that have hand proximity sensors 118 (on shifter handle 98 or steering wheel 30), the hand proximity sensors 123 are interfaced to the computer 100 as known in the industry.

In embodiments that have shifter force sensors 123 (on shifter shaft 99, the shifter force sensors 123 are interfaced to the computer 100 as known in the industry.

In some embodiments, one or more biometric sensors 15 are interfaced to the computer 100. The biometric sensors 15 sense, for example, fingerprints, retina, face characteristics, etc, of a user of the training system 10 to make sure the training and results correspond to the correct trainee 5, thereby preventing one trainee 5 from intentionally or unintentionally scoring/learning for another trainee 5.

In embodiments having a audio system 18, the audio system 18 is interfaced to the computer 100 as known in the industry such as audio outputs connected to amplifiers and speakers, TOSLINK, USB, etc.

In embodiments having a transmission transducer 106, the transmission transducer 106 is interfaced to the computer 100 as known in the industry such as through audio outputs connected to amplifiers and speakers, TOSLINK, USB, etc or over a local area network (see FIG. 12).

Referring to FIG. 5, a schematic view of a typical computer 100 is shown. The example computer 100 represents a typical computer system used as the heart of the training system 10. The example computer 100 is shown in its simplest form, having a single processor. Many different computer architectures are known that accomplish similar results in a similar fashion and the present invention is not limited in any way to any particular computer system. The present invention works well utilizing a single processor system, a multiple processor system where multiple processors share resources such as memory and storage, a multiple server system where several independent servers operate in parallel (perhaps having shared access to the data or any combination). In this, a processor 610 is provided to execute stored programs that are generally stored for execution within a memory 620. The processor 610 can be any processor or a group of processors, for example an Intel Pentium-4® CPU or the like. The memory 620 is connected to the processor in a way known in the industry such as by a memory bus 615 and is any memory 620 suitable for use with the selected processor 610, such as SRAM, DRAM, SDRAM, RDRAM, DDR, DDR-2, flash, FEROM, etc.

Also connected to the processor 610 is a system bus 630 for connecting to peripheral subsystems such as a network interface (not shown), a persistent storage 640 (e.g. a hard disk, semiconductor storage such as flash, a raid system, etc), a disk drive 650 (e.g. DVD), one or more graphics adapter(s) 660, a keyboard/mouse 670 and/or one or more touch screen interfaces 675. The graphics adapter(s) 660 receives commands and display information from the system bus 630 and generates a display image that is displayed on one or more of the graphic display devices 12/14/16/42/43/44.

In general, the hard disk 640 may be used to store programs, executable code and data (e.g. courseware 110 and user data 120) persistently. For data security and reliability, in some embodiments, the hard disk 640 is multiple disks or a raid system, etc. The removable disk drive 650 is often used to load CD/DVD/Blue ray disks having programs, executable code and data onto the hard disk 640. These peripherals are examples of input/output devices, persistent storage and removable media storage. Other examples of persistent storage include core memory, FRAM, flash memory, etc. Other examples of removable disk drives 650 include CDRW, DVD, DVD writeable, Blue ray, compact flash, other removable flash media, floppy disk, etc. In some embodiments, other devices are connected to the system through the system bus 630 or with other input-output connections. Examples of these devices include printers; graphics tablets; joysticks; audio components; and communications adapters such as modems and Ethernet adapters.

Although there are many ways anticipated for connecting training system components 13/30/32/34/36/106/118/123 to the processor, one preferred interface is a bi-directional local area network such as Car Area Network (CAN) 685 connected to the bus 630 by a Car Area Network (CAN) interface 680 as known in the industry. Any connection scheme to the system components 13/30/32/34/36/106/118/123 is anticipated including direct wiring, any local area network (e.g. Ethernet, CAN or VAN) and wireless (e.g. Bluetooth).

Figure 6:
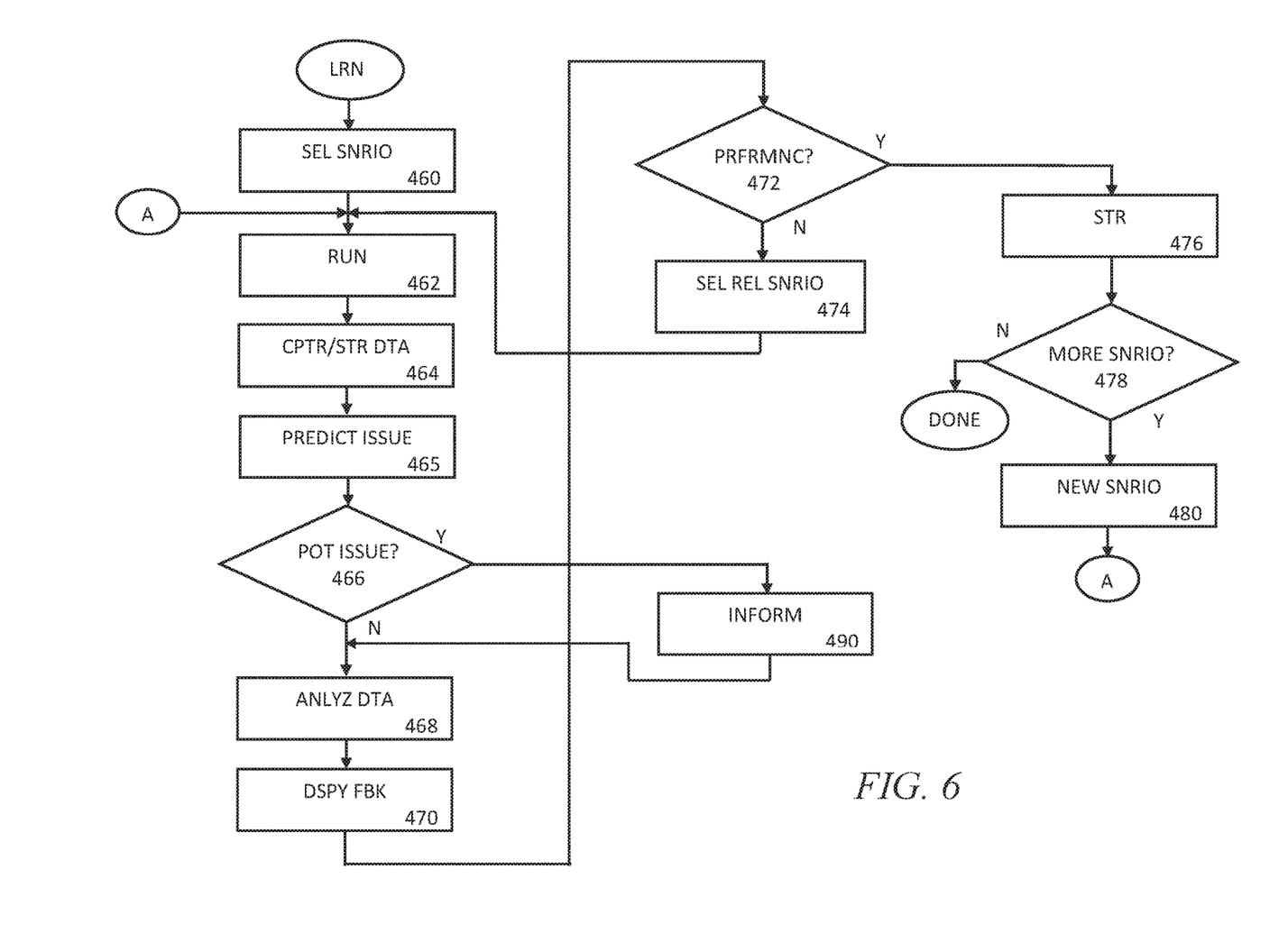
FIG. 6 illustrates a second flow chart of the adaptive training system.

Referring to FIG. 6 an exemplary flow chart of the adaptive training system is shown. Typically, a chapter or portion of a training course (courseware 110) is presented in one session to the trainee 5. The methods disclosed monitor the demonstrated abilities (or lack thereof) of the trainee 5 and adapts the training course to such. In this, a first scenario/segment from the chapter is selected 460 then run 462. Data is captured 464 during and/or after the scenario/segment is run. An example of a simple scenario/segment is a simulation of driving down a road way, approaching an unmarked intersection and a vehicle pulls out from the intersection into the path of the trainee 5.

Now a prediction engine or stored data in the scenario (courseware 110) determines 465 if a potential future issue is possible. For example, a prediction is made that it will be dark in 15 minutes or that a person might step into the street ahead in the scenario. If the prediction engine or stored date determines 465 that a potential future issue is possible 466 such as the trainee 5 has not turned on the headlights as dark is approaching or has not slowed down or changed lanes in view of the pedestrian, the trainee 5 is provided an informational message (e.g., either a text message on screen or an audio message). In this, the trainee 5 has not made any mistakes; it is just a proper time for the trainee 5 to start thinking about an action such as turning on the headlights, slowing down, or changing lanes. The informational message is a hint to the trainee 5 to consider what they should do before an incident occurs such as not being able to see because it is dark or hitting a pedestrian, etc.

Next, the data is analyzed 468 to determine the performance of the trainee 5 in the given scenario/segment meets passing requirements and information is displayed 470 to the trainee 5 on one or more of the display devices 12/14/16. If the performance indicates that the trainee 5 didn't perform the task sufficiently 472, a new scenario/segment is selected 474 (adaptive training). The new scenario/segment is selected 474 based upon elements of the prior scenario/segment that were not adequately performed. Since the method is adaptive, the method uses any existing or modified scenario/segment to fortify the element that was not adequately performed. For example, if while the training system 10 is in the simulation mode, the trainee 5 avoided the collision but the trainee 5 didn't step on the clutch while applying the brakes, therefore stalling the engine, one or more training scenarios/segments or chapters related to proper use of the clutch while braking are selected 474 to be presented to the trainee 5 either during the current session (e.g. the training system 10 enters a training mode and the training scenario/segment is presented while the trainee 5 remains in the training system 10) or during a future session.

If the trainee's 5 performance meets passing requirements 472, the data (e.g. results) are stored 476 for later reporting/analysis/grading and it is determined if there are more scenarios/segments 478 for the trainee 5 (e.g. scenarios/segments are often grouped in chapters and the trainee 5 is finished when he/she complete a chapter, etc.). If there are more scenarios/segments 478, the next scenario/segment is retrieved 480 and the above steps 462-478 are repeated until there are more scenarios/segments planned for the trainee 5.

The methods of the prior art do not predict potential issues and present informational messages to warn the trainee 5 of such potential issues. As discussed above, in some scenarios, the potential issues are predicted 465 by the prediction engine using data from the scenarios/segments (courseware 110) such as a darkness level or location of a pedestrian. The prediction engine then reviews a status of the simulation (e.g. headlights=off or speed=X or lane=right) and calculates whether there will be a potential issue using the data from the scenario in view of the status of the current simulation. For example, if the darkness level of the current scenario/segment is "dusk" and the status of the simulation indicates headlights=on, no informational messages in needed to warn the trainee 5 of such potential issues. Now, say the darkness level of the current scenario/segment is "dusk" and the status of the simulation indicates headlights=off, an informational messages in needed, warning the trainee 5 of such potential issues.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of driver/operator training comprising:
in a training system controlled by a computer, while the computer is presenting a simulation segment on one or more graphics displays that are interfaced to the computer to simulate a windshield of a target vehicle:
the computer reading data from input devices of the training system, the input devices comprising a gas pedal input device, a brake pedal input device, a transmission position detector, and a steering wheel rotation sensor;

analyzing the data in conjunction with a current state of the training system and the simulation segment to predict a potential future issue that includes a collision with an object within the simulation segment; and at a time that the analyzing predicts the potential future issue, the computer displaying an informational message comprising text characters on one of the one or more graphics displays to warn a trainee of the potential future issue.

2. The method of claim 1, wherein the input devices further comprises a transmission force detector, a transmission touch detector, a transmission pressure sensor, a steering wheel touch detector, and a biometric sensor.

3. The method of claim 1, wherein the step of displaying the informational message to warn of the potential future issue includes displaying a pop-up message on the one of the one or more graphics displays.

4. The method of claim 3, wherein the pop-up message is located on the one of the one or more graphics displays at a location of the object indicating the potential future issue.

5. The method of claim 1, wherein the step of displaying the informational message to warn of the potential future issue includes emitting an audio message on a speaker, the speaker operatively connected to the computer.

6. The method of claim 1, wherein the object comprises an obstacle within the simulation segment.

7. A method of driver operated training of a trainee on a training system, the training system comprising a computer that includes a storage device and a plurality of simulation segments, the plurality of simulation segments are stored on the storage device and accessible by the computer; the computer is operatively interfaced to one or more graphics displays that simulate windows/windshields of a target vehicle, at least one of the one or more graphics displays simulates a windshield of the target vehicle, the computer generates images on the one or more graphics displays; the computer is operatively interfaced to one or more input devices and one or more output devices, the one or more input devices and the one or more output devices corresponding to control/indicator devices of the target vehicle, the one or more input devices and the one or more output devices are in communication with the trainee; the method includes the following steps:

(a) the computer selecting a first simulation segment of the plurality of simulation segments as a current simulation segment;

(b) the computer presenting the current simulation segment on one or more of the one or more graphics displays and/or one or more of the one or more output devices, thereby the computer simulating an operational scenario of the target vehicle;

(c) the computer collecting data from the one or more input devices comprising at least a steering wheel rotation detector and a gas pedal input device;

(d) the computer analyzing the data with respect to the current simulation segment and a current state of the training system to predict a potential future issue, the potential future issue being related to a collision with an object within the current simulation segment;

(e) when there exists the potential future issue, the computer presenting an informational message to warn the trainee of the potential future issue, the informational message providing training in text characters on one of the one or more graphics displays;

(f) the computer determining a next simulation segment from the plurality of simulation segments as the current simulation segment; and (g) repeating steps b-f until the first simulation segment is complete.

8. The method of claim 7, wherein the step of the computer presenting the informational message related to the potential future issue includes displaying information from the current simulation segment on one of the one or more graphics displays that simulates the windshield of the target vehicle.

9. The method of claim 7, wherein the one or more input devices further comprise a brake pedal, and a transmission position detector.

10. The method of claim 7, wherein the one or more output devices is selected from a group consisting of an illumination device, an audio transducer, and a vibration transducer.

11. The method of claim 7, wherein the step of the computer presenting the informational message to warn of the trainee of the potential future issue includes displaying a pop-up message on one of the one or more graphics displays that simulates the windshield of the target vehicle.

12. The method of claim 11, wherein the pop-up message is located on the one or more graphics displays that simulates the windshield of the target vehicle at a location of the object.

13. The method of claim 10, wherein the step of the computer presenting the informational message to warn of the potential future issue includes emitting an audio message on the audio transducer.

14. A training system comprising:

a computer, the computer having means for storing data;

a plurality of simulation segments stored in the means for storing the data, the plurality of simulation segments accessible by the computer;

one or more graphics displays, at least one of the one or more graphics displays simulates a windshield of a target vehicle, the computer has means for generating images on the one or more graphics displays;

one or more input devices, the one or more input devices corresponding to control devices of the target vehicle comprising a gas pedal input device and a steering input device, the one or more input devices are operatively coupled to the computer;

software running on the computer causes the computer to present a simulation segment of the plurality of simulation segments; in such, the software running on the computer causes the computer to display a content of the simulation segment on one or more of the one or more graphics displays, thereby the software running on the computer causes the computer to simulate an operation of the target vehicle;

concurrently, the software running on the computer causes the computer to collect data from the one or more input devices; and the software running on the computer causes the computer to analyze the data, a current state of the training system, and the simulation segment and to determine if a potential future issue exists, the potential future issue being related to a collision with an object within the simulation segment; at a time when it is determined that the potential future issue exists, the software running on the computer causes the computer to emit an informational message that provides a hint regarding the potential future issue, the informational message comprising text displayed on at least one of the one or more graphics displays, the text provides training.

15. The training system of claim 14, wherein the one or more input devices further comprise a brake pedal input device, and a transmission position detector.

16. The training system of claim 14, further comprising means for simulating shifting, the means for simulating shifting having a hand touch sensor.

17. The training system of claim 14, further comprising one or more output devices selected from a the group consisting of an audio output device, an illuminating device, and a vibration emitting device.

18. The training system of claim 14, wherein the informational message that provides the hint regarding the potential future issue comprises a pop-up message on one of the one or more graphics displays simulates the windshield of the target vehicle.

19. The training system of claim 18, wherein the pop-up message is located on the one of the one or more graphics displays simulates the windshield of the target vehicle at a location of the object.

20. The training system of claim 17, wherein the informational message that provides the hint regarding the potential future issue comprises an audio message on the audio output device.

\* \* \* \* \*